United States Patent
Zhang

(10) Patent No.: US 8,093,768 B2
(45) Date of Patent: Jan. 10, 2012

(54) PORTABLE ELECTRONIC DEVICE

(75) Inventor: Tao Zhang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 329 days.

(21) Appl. No.: 12/578,986

(22) Filed: Oct. 14, 2009

(65) Prior Publication Data

US 2010/0231057 A1  Sep. 16, 2010

(51) Int. Cl.
*H02K 7/06* (2006.01)
(52) U.S. Cl. ...................... 310/23; 310/12.12
(58) Field of Classification Search ............. 310/23–24, 310/71, 81, 12.12; 320/107
See application file for complete search history.

(56) References Cited

U.S. PATENT DOCUMENTS

| | | | | |
|---|---|---|---|---|
| 4,939,707 A | * | 7/1990 | Nagao | 368/64 |
| 5,630,155 A | * | 5/1997 | Karaki et al. | 713/340 |
| 5,644,207 A | * | 7/1997 | Lew et al. | 320/101 |
| 5,949,215 A | * | 9/1999 | Takakura | 320/114 |
| 2009/0256429 A1 | * | 10/2009 | Fan | 310/25 |
| 2010/0253632 A1 | * | 10/2010 | Chen et al. | 345/169 |

* cited by examiner

*Primary Examiner* — Thanh Lam
(74) *Attorney, Agent, or Firm* — Altis Law Group, Inc.

(57) ABSTRACT

A portable electronic device includes a housing, a plurality of buttons mounted on the housing for operating the portable electronic device, a power supply received in the housing for supplying working electric power to the portable electronic device, and a generator unit. The generator unit includes a plurality of magnetic components mounted on the buttons and a plurality of windings received in the housing and electronically connected to the power supply. Thereby induced currents for charging the power supply are generated when the magnetic components are moved with the movements of the operated buttons.

15 Claims, 4 Drawing Sheets

PORTABLE ELECTRONIC DEVICE

BACKGROUND

1. Technical Field

The present disclosure relates to portable electronic devices, and particularly to a power saving portable electronic device.

2. Description of Related Art

Portable electronic devices, such as mobile phones, personal digital assistants (PDA), and laptop computers, are widely used. Most portable electronic devices have buttons mounted thereon for operation. However, operating the buttons consumes a lot electric power over when the device is in standby modes. Also, frequent usage of the buttons, e.g., using the buttons to edit short messages or to play games, may dramatically deplete the electric power of the battery of the portable electronic device. Thus, the portable electronic device needs to be frequently charged, which causes inconvenience to the user thereof.

Therefore, there is room for improvement within the art.

BRIEF DESCRIPTION OF THE DRAWINGS

Many aspects of the present portable electronic device using the same can be better understood with reference to the following drawings. The components in the various drawings are not necessarily drawn to scale, the emphasis instead being placed upon clearly illustrating the principles of the present portable electronic device. Moreover, in the drawings, like reference numerals designate corresponding parts throughout the figures.

DETAILED DESCRIPTION

Figure 1:
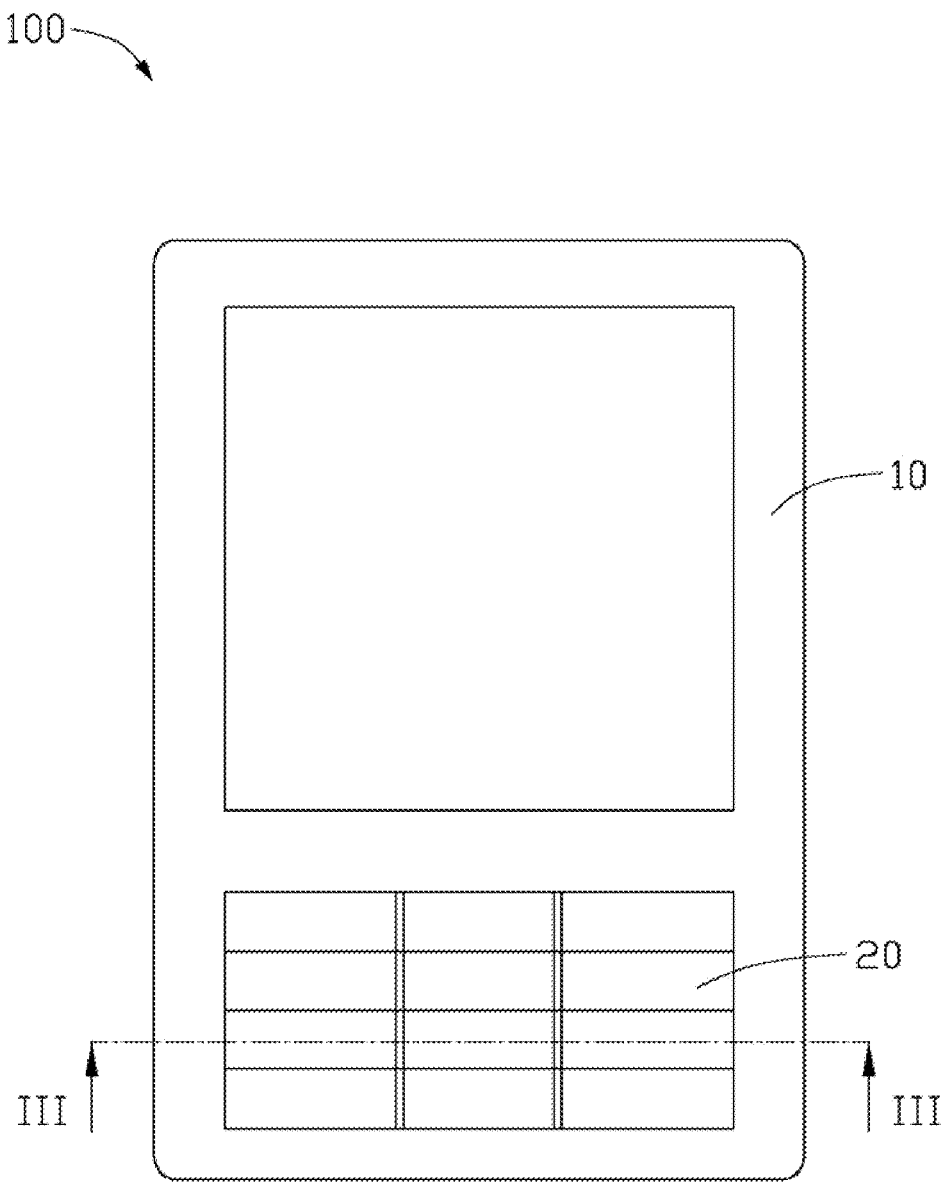
FIG. 1 is a schematic view of a portable electronic device, according to an exemplary embodiment.
Figure 2:
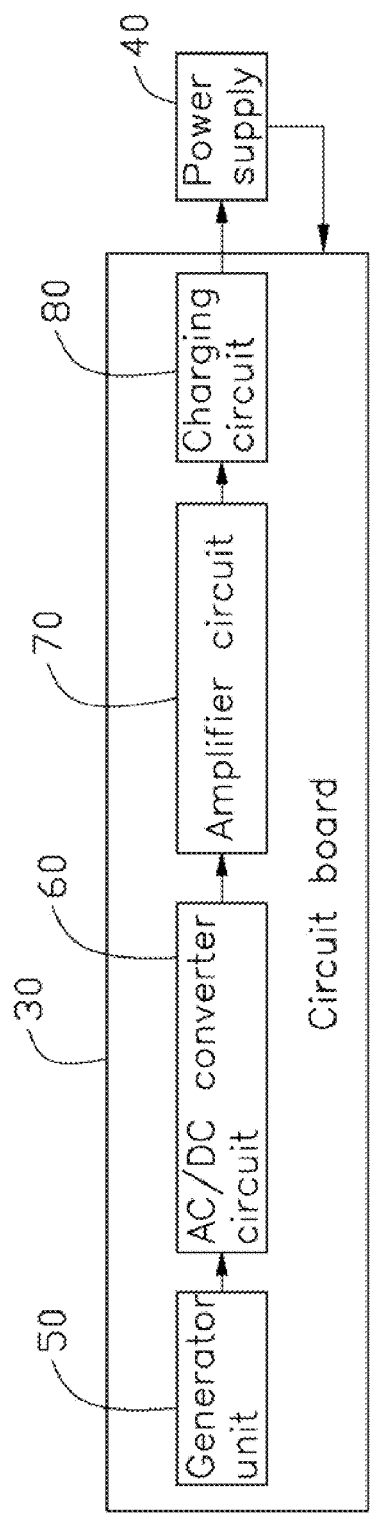
FIG. 2 is a block diagram of the portable electronic device shown in FIG. 1.

FIG. 1 schematically shows a portable electronic device 100 according to an exemplary embodiment. In the present disclosure, the portable electronic device 100 is a mobile phone, but can also be a personal digital assistant (PDA), a game console, a laptop computer, etc. Also referring to FIG. 2, the portable electronic device 100 includes a housing 10, a plurality of buttons 20, a circuit board 30, a power supply 40, a generator unit 50, an alternating current/direct current (AC/DC) converter circuit 60, an amplifier circuit 70, and a charging circuit 80.

The housing 10 can be a conventional case used in portable electronic devices. The buttons 20 are mounted on an outside surface of the housing 10. The buttons 20 can be pressed to move perpendicularly to the surface and rebound when the pressing force is removed. The movements of the buttons 20 can activate corresponding operating circuits, thereby generating electronic signals to operate the portable electronic device 100. The circuit board 30, the power supply 40, the generator unit 50, the AC/DC converter 60 and the amplifier 70 are received in the housing 10. The circuit board 30 can be a conventional circuit board used in portable electronic devices. The buttons 20 are positioned above the circuit board 30, such that the movements of the operated buttons 20 are perpendicular to the circuit board 30. The power supply 40 can be a conventional chargeable battery received in the housing 10 and electronically connected to the circuit board 30 to supply electric power.

Figure 3:
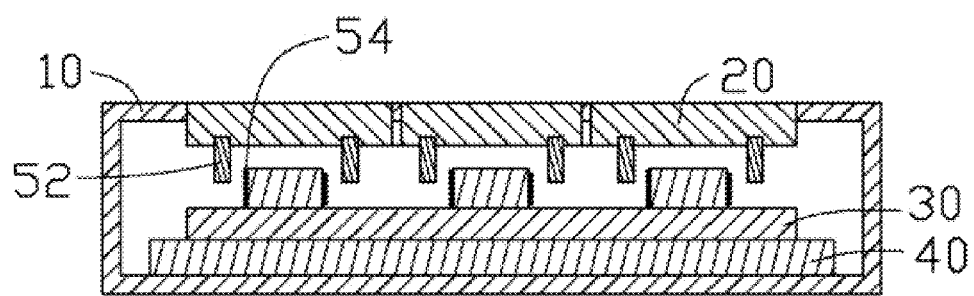
FIG. 3 is a cutaway view along the line III-III shown in FIG. 1.
Figure 4:
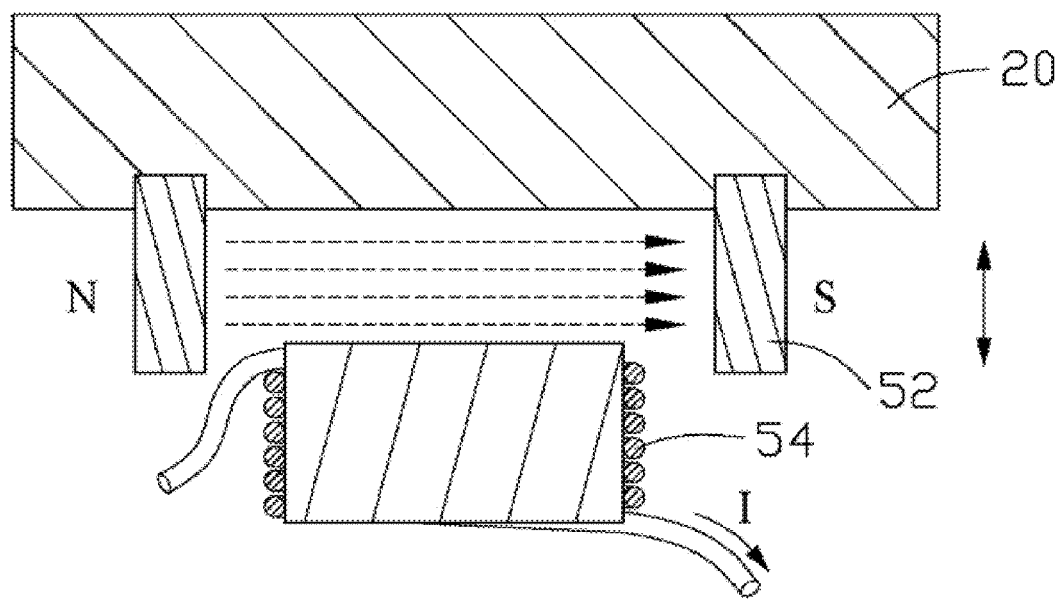
FIG. 4 is a schematic view of generating electric power by operating a button of the portable electronic device shown in FIG. 1.

Also referring to FIG. 3 and FIG. 4, the generator unit 50 includes a plurality of magnetic components 52 and a plurality of windings 54. The magnetic components 52 can be permanent magnets or electromagnets. Each magnetic component 52 is installed on a surface of a button 20 facing the circuit board 30, and can be moved with the movement of the button 20. The windings 54 are mounted on the circuit board 30, wherein each winding 54 is aligned with a corresponding magnetic component 52. When a button 20 having a magnetic component 52 is pressed to move towards the circuit board 30, an induced current is generated in the winding 54 as the magnetic component 52 passes therethrough. When the pressing force is removed, the button 20 rebounds, and a reversed induced current is generated in the winding 54 as the magnetic component 52 passes therethrough. Therefore, the winding 54 can generate an alternating current (AC) when the button 20 is pressed to operate the portable electronic device 100.

The AC/DC converter circuit 60 can be a diode mounted on the circuit board 30 and electronically connected to the winding 54. The AC/DC converter circuit 60 can convert the alternating current generated in the winding 54 into a direct current (DC). The amplifier circuit 70 can be a conventional DC amplifier circuit mounted on the circuit board 30 and electronically connected to the AC/DC converter circuit 60. The charging circuit 80 can be a conventional charging circuit mounted on the circuit board 30 and electronically connected to the amplifier circuit 70. The power supply 40 received in the housing 10 can be electrically connected to charging circuit 80. Thus, the current converted by the AC/DC converter circuit 60 can be amplified by the amplifier circuit 70 and finally transmitted to the power supply 40 via the charging circuit 80 to charge the power supply 40.

In use, the power supply 40 is received in the housing 10 and is electrically connected to the circuit board 30 to supply working electric power to the portable electronic device 100, and is also electrically connected to the charging circuit 80. The buttons 20 are then pressed to operate the portable electronic device 100. According to the above-mentioned method, induced currents are generated in the windings 54 corresponding to the pressed/rebounding buttons 20 and the magnet components 52 installed thereon. The AC/DC converter circuit 60 converts the induced currents into direct currents, and the amplifier circuit 70 amplifies the direct currents. Finally, the amplified currents are transmitted to the power supply 40 via the charging circuit 80 to charge the power supply 40. Thus, operations on the buttons 20 not only consume electric energy of the power supply 40, but also supply new electric energy to the power supply 40.

When the present portable electronic device 100 is used, the kinetic energy for operating the portable electronic device 100 can be converted into electric power, and the electric power is used to charge the power supply 40. Therefore, despite that operations on the buttons 20 consume electric energy of the power supply 40, the movements of the buttons 20 and the magnetic components 52 synchronously generate new electric power to charge the power supply 40. Therefore, the kinetic energy for operating the portable electronic device 100 can be recycled, and the available electric power of power supply 40 can be maintained. Furthermore, when the buttons 20 are operated, the power supply 40 can be charged at any moment and everywhere. Thus, the users of the portable electronic device 100 do not need to spend time charging the power supply 40 according to conventional methods.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device, comprising:
    a housing;
    a plurality of buttons mounted on the housing for operating the portable electronic device;
    a power supply received in the housing for supplying working electric power to the portable electronic device; and
    a generator unit, the generator unit including a plurality of magnetic components mounted on the buttons and a plurality of windings received in the housing and electronically connected to the power supply; wherein induced currents for charging the power supply are generated when the magnetic components move through the windings.

2. The portable electronic device as claimed in claim 1, further comprising a circuit board received in the housing and electronically connected to the power supply, the buttons positioned above the circuit board and the magnetic component facing the circuit board.

3. The portable electronic device as claimed in claim 2, wherein the windings are mounted on the circuit board, each winding being aligned with a corresponding magnetic component.

4. The portable electronic device as claimed in claim 3, wherein induced currents for charging the power supply are generated when a button with the magnetic component mounted thereon is pressed towards the circuit board.

5. The portable electronic device as claimed in claim 3, wherein induced currents for charging the power supply are generated when a button with the magnetic component mounted thereon is released from an operating pressing force and rebounds away from the circuit board.

6. The portable electronic device as claimed in claim 1, further comprising an alternating current/direct current (AC/DC) converter circuit electronically connected between the windings and the power supply.

7. The portable electronic device as claimed in claim 1, further comprising an amplifier circuit electronically connected between the windings and the power supply.

8. The portable electronic device as claimed in claim 1, further comprising a charging circuit electronically connected between the windings and the power supply.

9. A portable electronic device, comprising:
    a housing;
    a plurality of buttons mounted on the housing for operating the portable electronic device;
    a circuit board received in the housing;
    a power supply received in the housing and electronically connected to the circuit board for supplying working electric power to the portable electronic device; and
    a generator unit mounted on the buttons and the circuit board and electronically connected to the power supply, wherein the generator unit converts kinetic energy for operating the buttons into electric energy used to charge the power supply.

10. The portable electronic device as claimed in claim 9, wherein the generator unit includes a plurality of magnetic components mounted on the buttons and a plurality of windings mounted on the circuit board and electronically connected to the power supply, each winding being aligned with a corresponding magnetic component.

11. The portable electronic device as claimed in claim 10, wherein induced currents for charging the power supply are generated when a button with the magnetic component mounted thereon is pressed towards the circuit board.

12. The portable electronic device as claimed in claim 10, wherein induced currents for charging the power supply are generated when a button with the magnetic component mounted thereon is released from an operating pressing force and rebounds away from the circuit board.

13. The portable electronic device as claimed in claim 9 further comprising an alternating current/direct current (AC/DC) converter circuit electronically connected between the windings and the power supply.

14. The portable electronic device as claimed in claim 9, further comprising an amplifier circuit electronically connected between the windings and the power supply.

15. The portable electronic device as claimed in claim 9, further comprising a charging circuit electronically connected between the windings and the power supply.

* * * * *